(12) United States Patent
Katsumata (10) Patent No.: US 8,734,147 B2
(45) Date of Patent: May 27, 2014

(54) SEAL STRUCTURE FOR PRESSURIZED CONTAINER, COOLING TREATMENT APPARATUS, MULTI-CHAMBER HEAT TREATMENT APPARATUS, PRESSURE REGULATING METHOD, AND OPERATING METHOD

(75) Inventor: Kazuhiko Katsumata, Saitama (JP)

(73) Assignee: IHI Corporation (JP)

( * ) Notice: Subject to any disclaimer, the term of this patent is extended or adjusted under 35 U.S.C. 154(b) by 1231 days.

(21) Appl. No.: 12/295,924

(22) PCT Filed: Apr. 6, 2006

(86) PCT No.: PCT/JP2006/307359
§ 371 (c)(1),
(2), (4) Date: Dec. 22, 2008

(87) PCT Pub. No.: WO2007/113920
PCT Pub. Date: Oct. 11, 2007

(65) Prior Publication Data
US 2009/0186311 A1 Jul. 23, 2009

(51) Int. Cl.
*F27B 7/24* (2006.01)
(52) U.S. Cl.
USPC .......................................... 432/115; 277/362
(58) Field of Classification Search
USPC .......... 432/115, 244; 277/347, 345, 348, 358, 277/362, 590, 592, 903
See application file for complete search history.

(56) References Cited

U.S. PATENT DOCUMENTS

| | | | | |
|---|---|---|---|---|
| 3,467,396 A | * | 9/1969 | Hershey | 277/362 |
| 5,209,495 A | | 5/1993 | Palmour | 277/3 |
| 5,669,636 A | * | 9/1997 | Kubala | 285/98 |
| 6,431,553 B1 | * | 8/2002 | Amaral et al. | 277/580 |
| 6,467,774 B1 | * | 10/2002 | Amaral et al. | 277/579 |
| 7,694,977 B2 | * | 4/2010 | Laitinen | 277/371 |
| 2009/0079138 A1 | * | 3/2009 | Keiser | 277/586 |

FOREIGN PATENT DOCUMENTS

| | | |
|---|---|---|
| EP | 1 643 199 | 4/2006 |
| JP | 5-42482 | 3/1986 |
| JP | UM-A-62-025799 | 2/1987 |
| JP | 5-296352 | 11/1993 |
| JP | 2001-132847 | 5/2001 |
| JP | 2001-173794 | 6/2001 |
| JP | 2005-016861 | 1/2005 |
| JP | 2005-29872 | 2/2005 |
| JP | UM-05-047798 | 6/2011 |
| KR | 2000-0010877 | 6/2000 |
| KR | 20-0297439 | 11/2002 |
| TW | 505756 | 10/2002 |
| WO | WO 87/01171 | 2/1987 |

OTHER PUBLICATIONS

Official Action issued in counterpart Korean Patent Application No. 10-2008-7026809 dated Oct. 18, 2010 with a English translation.

(Continued)

*Primary Examiner* — Gregory A Wilson
(74) *Attorney, Agent, or Firm* — Ostrolenk Faber LLP (57) ABSTRACT

This shaft seal structure has at a fitting portion between a container wall of a pressurized container in which high pressure gas is enclosed and a rotating shaft that passes through the container wall: O-rings that are disposed at least two locations in the axial direction of the rotating shaft; and grease that is pressurized.

8 Claims, 6 Drawing Sheets

(56) References Cited

OTHER PUBLICATIONS

Taiwanese Office Action issued in counterpart Taiwanese Patent Application No. 095112124 dated Jun. 14, 2011 with an English translation.
Korean Office Action issued in counterpart Korean Patent Application No. 10-2008-7026809 dated Jun. 22, 2011 with an English translation.
International Search Report dated Jul. 11, 2006, issued in corresponding international application No. PCT/JP2006/307359.
Supplementary Search Report dated Feb. 20, 2012 issued in corresponding European Patent Application No. 06731307.2 (7 pages).
Notice of Allowance dated Jan. 15, 2013 issued in corresponding Japanese Patent Application No. 2008-508444 (with English translation).

* cited by examiner

SEAL STRUCTURE FOR PRESSURIZED CONTAINER, COOLING TREATMENT APPARATUS, MULTI-CHAMBER HEAT TREATMENT APPARATUS, PRESSURE REGULATING METHOD, AND OPERATING METHOD

CROSS REFERENCE TO RELATED APPLICATIONS

The present application is a 35 U.S.C. §371 National Phase conversion of PCT/JP2006/307359, filed Apr. 6, 2006. The PCT International Application was published in the Japanese language.

TECHNICAL FIELD

The present invention relates to a seal structure, a cooling treatment apparatus, a multi-chamber heat treatment apparatus, a pressure regulating method, and an operating method.

BACKGROUND ART

A heat treating apparatus that performs so-called tempering by heating and cooling a metal member that is a treatment object conventionally performs cooling treatment by placing the treatment object that has been heat treated midway in a flow path of a cooling gas that circulates in a heat treating furnace.

Specifically, the treatment object is placed in a cooling chamber that is formed within the heat treating furnace, and by supplying a coolant gas to this cooling chamber and rotating a fan, the coolant gas is circulated (refer to Patent Document 1).

In this kind of heat treating apparatus, since a pressurized coolant gas is used, the cooling chamber is constituted by a pressurized container. For this reason, the motor that rotates the fan is arranged inside of the pressurized container that serves as the cooling chamber.

However, a motor that can be used inside of a pressurized container is costly due to its special features, so using a moderately priced general-purpose motor has been desired. In the case of using a general-purpose motor, in order to transmit the rotation of the general-purpose motor that is arranged outside of the pressurized container, it is necessary to pass the output shaft of the general-purpose motor or the rotating shaft that is connected thereto through the container wall of the pressurized container and arrange a shaft seal structure between the output shaft or rotating shaft and the container wall. A magnetic seal, for example, has been proposed as the shaft seal structure that can be used in the container wall of the pressurized container.

Patent Document 1: Japanese Unexamined Patent Application, Publication No. 2005-29872

Patent Document 2: Japanese Granted Patent Application, Publication No. H05-42482

However, since the interior of the pressurized container that serves as the cooling chamber is raised to a pressure of, for example, 30 atm (3.0 MPa), the problem arises of not being able to readily seal the container with the magnetic seal.

The present invention was achieved in view of the above circumstances, and has as its object to provide a shaft seal structure that is capable of being suitably applied to a rotating shaft that passes through a container wall of a pressurized container, a cooling treatment apparatus that is provided with this shaft seal structure, a multi-chamber heat treatment apparatus, a pressure regulating method, and an operating method.

DISCLOSURE OF THE INVENTION

The shaft seal structure according to the present invention is characterized by providing at a fitting portion between a container wall of a pressurized container in which high pressure gas is enclosed and a rotating shaft that passes through the container wall O-rings that are disposed at least two locations in the axial direction of the rotating shaft; and grease that is pressurized to approximately the same pressure as the pressure of the high pressure gas in a space that is formed by the rotating shaft, the container wall, and the O-rings.

Also, it is characterized by having a grease pressure measuring portion that measures changes in the pressure of the grease that is filled in the space, and a gas leakage detecting portion that detects leaks of the high pressure gas from the pressurized container based on the measurement result of the grease pressure measuring portion.

A cooling treatment apparatus according to the present invention that disposes a treatment object that has been subjected to heat treatment in a pressurized container and cools the treatment object by supplying high pressure gas in the pressurized container and circulating it with a fan, characterized by providing, at a fitting portion between a rotating shaft that passes through the container wall of the pressurized container to transmit torque to the fan and the container wall, a shaft seal structure comprising O-rings that are disposed at least two locations in the axial direction of the rotating shaft; and grease that is pressurized to approximately the same pressure as the pressure of the high pressure gas in a space that is formed by the rotating shaft, the container wall, and the O-rings.

Also, it is characterized by the shaft seal structure having a grease pressure measuring portion that measures changes in the pressure of the grease that is filled in the space, and a gas leakage detecting portion that detects leaks of the high pressure gas from the pressurized container based on the measurement result of the grease pressure measuring portion.

Also, it is characterized by having an acceleration mechanism that causes the fan to rotate at a higher rotational frequency than the rotating axis.

A multi-chamber heat-treatment apparatus that has a heating chamber that performs heat treatment on a treatment object and a cooling chamber that performs cooling treatment on the treatment object that has been subjected to heat treatment in the heating chamber, characterized by using the abovementioned cooling treatment apparatus as the cooling chamber.

A pressure regulating method according to the present invention is characterized by, in the abovementioned shaft seal structure, pressurizing the grease to a first set pressure and maintaining that state, and pressurizing the grease to the first set pressure again when the pressure of the grease has fallen to a second set pressure.

An operating method according to the present invention is characterized by, in the abovementioned cooling treatment apparatus, pressurizing the grease to a first set pressure and maintaining that state, and stopping the cooling treatment operation when the pressure of the grease has fallen from a second set pressure to a third set pressure in a predetermined time.

EFFECT OF THE INVENTION

With the shaft seal structure according to the present invention, it is possible to apply a shaft seal structure whose structure is simple and moderately priced and having high reliability to a rotating shaft that passes through the container wall of a pressurized container. Also, since changes in the filling pressure of the grease that is filled at a predetermined pressure between the plurality of O-rings that constitute the shaft seal structure are detected, it is possible to detect that the sealed state by the shaft seal structure has become unmaintainable.

With the cooling treatment apparatus according to the present invention, since a shaft seal structure whose structure is simple and moderately priced and having high reliability is applied to a rotation shaft that transmits rotation to a fan that is disposed in the cooling container and passes through the container wall of a pressurized container, it is possible to use a moderately priced general-purpose motor as the motor for driving the rotating shaft. Also, it is possible to detect that the sealed state by the shaft seal structure that is applied to the rotation shaft has become unmaintainable. Also, it is possible to rotate the fan at the desired rotational frequency even when the predetermined rotational frequency of the rotating shaft is low.

With the multi-chamber heat-treatment apparatus according to the present invention, it is possible to reliably perform cooling treatment of a treatment object X and possible to obtain a moderately priced apparatus.

With the pressure regulating method according to the present invention, even when the pressure of the grease that is filled at the first set pressure falls to a second set pressure in the abovementioned shaft seal structure, since the grease is pressurized again, it is possible to prevent a leakage of high-pressure gas due to the sealed state by the shaft seal structure becoming umaintainable.

With the operating method according to the present invention, even when it is determined that the sealed state by the shaft seal structure has become unmaintainable in the abovementioned cooling treatment apparatus, it is possible to restrict damage to the shaft seal structure to a minimum.

DESCRIPTION OF REFERENCE NUMERALS 1 multi-chamber heat treatment apparatus
2 cooling chamber (pressurized container)
2a cooling treatment apparatus
3 heating chamber
5 door (container wall)
5a through hole
16 cooling fan
20 cooling fan motor
100 transmission mechanism (acceleration mechanism)
108 rotating shaft
110 bush
112 through hole
113, 114 grease supply holes
115 O-ring
120 shaft seal structure
121, 122 bearings
123, 124, 125 O-rings
150 inert gas supplying portion
151 pressure source
152 pressure sensor (grease pressure measuring portion)
153 electromagnetic valve
154 pressure controller (gas leakage detecting portion)
200 transmission mechanism (acceleration mechanism)
220 shaft seal structure
X treatment object
S space
R grease

BEST MODE FOR CARRYING OUT THE INVENTION

Hereinbelow, preferred embodiments of the present invention shall be described with reference to the appended drawings.

Figure 1:
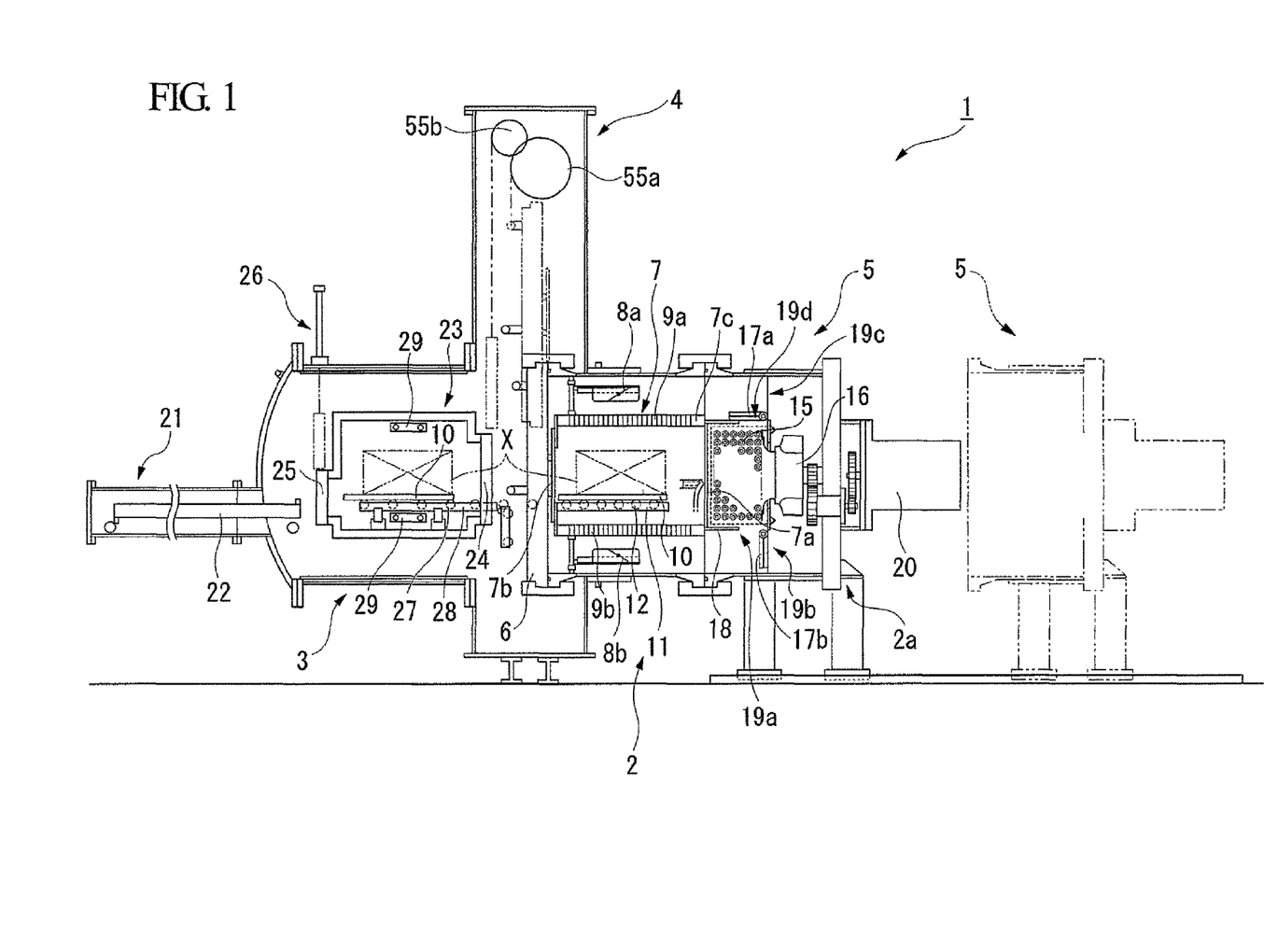
FIG. 1 is a schematic cross-sectional view of the overall structure of the multi-chamber heat treatment apparatus 1 according to the present embodiment.

FIG. 1 is a schematic cross-sectional view of the overall structure of a multi-chamber heat treatment apparatus 1 according to the present embodiment.

The multi-chamber heat treatment apparatus 1 is a multi-chamber-type heat treatment apparatus that is provided with a cooling chamber 2 that cools a treatment object X and a heating chamber 3 that heats the treatment object X, and additionally has an intermediate chamber 4 that is arranged between the cooling chamber 2 and the heating chamber 3.

The cooling chamber 2 is set to have an approximately cylindrical shape, and is set so that the central axis of this cylindrical shape is horizontally oriented. A clutch-type door 5 that moves horizontally in the axial direction of the cooling chamber 2 is provided on one side of the cooling chamber 2 (the right side in FIG. 1), and a clamp-type vacuum-shield door 6 that opens and closes vertically is provided on the other side (the left side in FIG. 1). Note that the entity that includes the cooling chamber 2 and a cooling fan motor 20 and the like described below is called a cooling treatment apparatus 2a.

The inside space of the multi-chamber heat treatment apparatus 1 enters a sealed state of being shut off from the outside in the state of the door 5 being closed. A wind path chamber 7 with a substantially parallelepiped shape that is long in the central axis direction of the cooling chamber 2 is installed inside of this cooling chamber 2, and gas flow guide plates 8a, 8b that adjust the flow path direction of the coolant gas in the cooling chamber 2 are respectively provided at the top and bottom of the wind path chamber 7. Also, the interior of the cooling chamber 2 outside of the wind path chamber 7 is vertically divided by a partition plate not illustrated.

A side surface portion 7a of one side of the wind path chamber 7 (the right side in FIG. 1) that corresponds to the lengthwise direction of the wind path chamber 7 is open, while a side surface portion 7b of the other side (the left side in FIG. 1) is fixed to the vacuum shield door 6 and formed to be freely detachable with a main body 7c of the wind path chamber 7.

Lattice-shaped flow regulating plates 9a, 9b that regulate and pass the coolant gas are respectively provided at the upper wall portion and lower wall portion of the wind path chamber 7. Also, a transfer table 11 for transporting a tray 10 that carries the treatment object X in the axial direction of the cooling chamber 2 is installed inside of the wind path chamber 7, and a plurality of free rollers 12 are provided in the transfer table 11 to rotate freely in the transport direction of the tray 10I Also, the tray 10 is formed for example in a lattice shape so that the coolant gas is capable of passing through.

The door 5 is formed in a hollow shape, and the interior is equipped with a heat exchanger 15, a cooling fan 16, and dampers 17a, 17b. The heat exchanger 15 cools the coolant gas by performing heat exchange between water and the coolant gas, and is arranged inside of a heat-exchanger storing chamber 18 that is disposed within the door 5. The cooling fan 16 serves to adjust the flow quantity of the coolant gas which has passed a gas passage port 19a from the inside of the heat exchanger 15, and is disposed between the heat exchanger 15 and the inner surface of the door 5, that is, so as to be removed in the horizontal direction from the side surface of the treatment object X that is placed in the cooling chamber 2. This cooling fan 16 is driven by a cooling fan motor 20 that is arranged so as to project from the door 5.

The dampers 17a, 17b determine the blowing direction (cooling wind direction) of the coolant gas with respect to the treatment object X under the control of a cooling control portion that is not illustrated, and selectively close gas passage ports 19a, 19b, 19c, 19d that are formed at the upper side of the heat-exchanger storing chamber 18. Note that the interior of the door 5 outside of the heat-exchanger storing chamber 18 is vertically divided by a partition plate not illustrated.

The heating chamber 3 is set to have an approximate cylindrical shape with water-cooled double walls, with water interposed between the inner wall and the outer wall, and is disposed facing the cooling chamber 2. Also, a conveying rod 22 for conveying the treatment object N by conveying the tray 10 on which the treatment object X is placed inside of the multi-chamber heat treatment apparatus 1 is disposed inside of a conveying rod housing chamber 21 that is coupled to the heating chamber 3.

A heating container 23 that is set to a substantially parallelepiped shape is provided inside of the heating chamber 3. A heat insulation door 24 (heat chamber door) that opens and closes vertically is installed on one side of the heating container 23 (the side that faces the cooling chamber 2), and a conveying rod door 25 that serves and the entrance/exit of the conveying rod 22 is provided at the other side. This conveying rod door 25 is opened and closed in the vertical direction by a raising-lowering mechanism 26 that is installed so that it projects from the outer wall of the heat chamber 3.

A transfer table 28 that has a plurality of free rollers 27 for moving the tray 10 on which the treatment object X is placed in the axial direction of the heating chamber 3 is installed inside of the heating chamber 23, and this transfer table 28 is arranged on the extended line of the transfer table 11 that is installed inside of the wind path chamber 7. Note that the conveying rod door 25, the transfer table 28, and the tray 10 are designed to have heat insulating properties similarly to the heat insulation door 24. Also, a plurality of heaters 29 for heating the treatment object X are provided above and below the treatment object X so that the entire treatment object X is uniformly heated.

The intermediated chamber 4 is set to be hollow with a substantially rectangular shape, and is disposed between the cooling chamber 2 and the heating chamber 3. At the upper portion thereof are disposed a raising-lowering mechanism 55a that consists of a hoist for raising and lowering the vacuum shield door 6 and a heat insulation door raising-lowering portion 55b for raising and lowering the heat insulation door 24.

A pressure reducing apparatus that is not illustrated is installed on the outside of the cooling chamber 2, the heating chamber 3, and the intermediate chamber 4. This pressure reducing apparatus evacuates the interior of the cooling chamber 2 and the heating chamber 3, and is connected to the cooling chamber 2 and the heating chamber 3, respectively. Also, a coolant gas supply apparatus that is not illustrated is also provided on the outside of the cooling chamber 2, the heating chamber 3, and the intermediate chamber 4. This coolant gas supply apparatus supplies coolant gas to the inside of the cooling chamber 2 at a predetermined pressure based on a coolant gas control signal that is input from the cooling control portion. Note that during maintenance work on the multi-chamber heat treatment apparatus 1, since coolant gas may be supplied to the heating chamber 3 and the intermediate chamber 4 that are external to the cooling chamber 2, the coolant gas supply apparatus is also connected to the intermediate chamber 4.

The cooling control portion controls the cooling treatment in the cooling chamber 2 based on a temperature signal that is input from a temperature measurement portion 32, that is, the temperature of the treatment object X. Also, it outputs a motor driving signal via a cooling fan inverter not illustrated to the cooling fan motor 20.

Next, the constitution of the shaft seal structure 120 that is provided in the door 5 shall be described.

Figure 2:
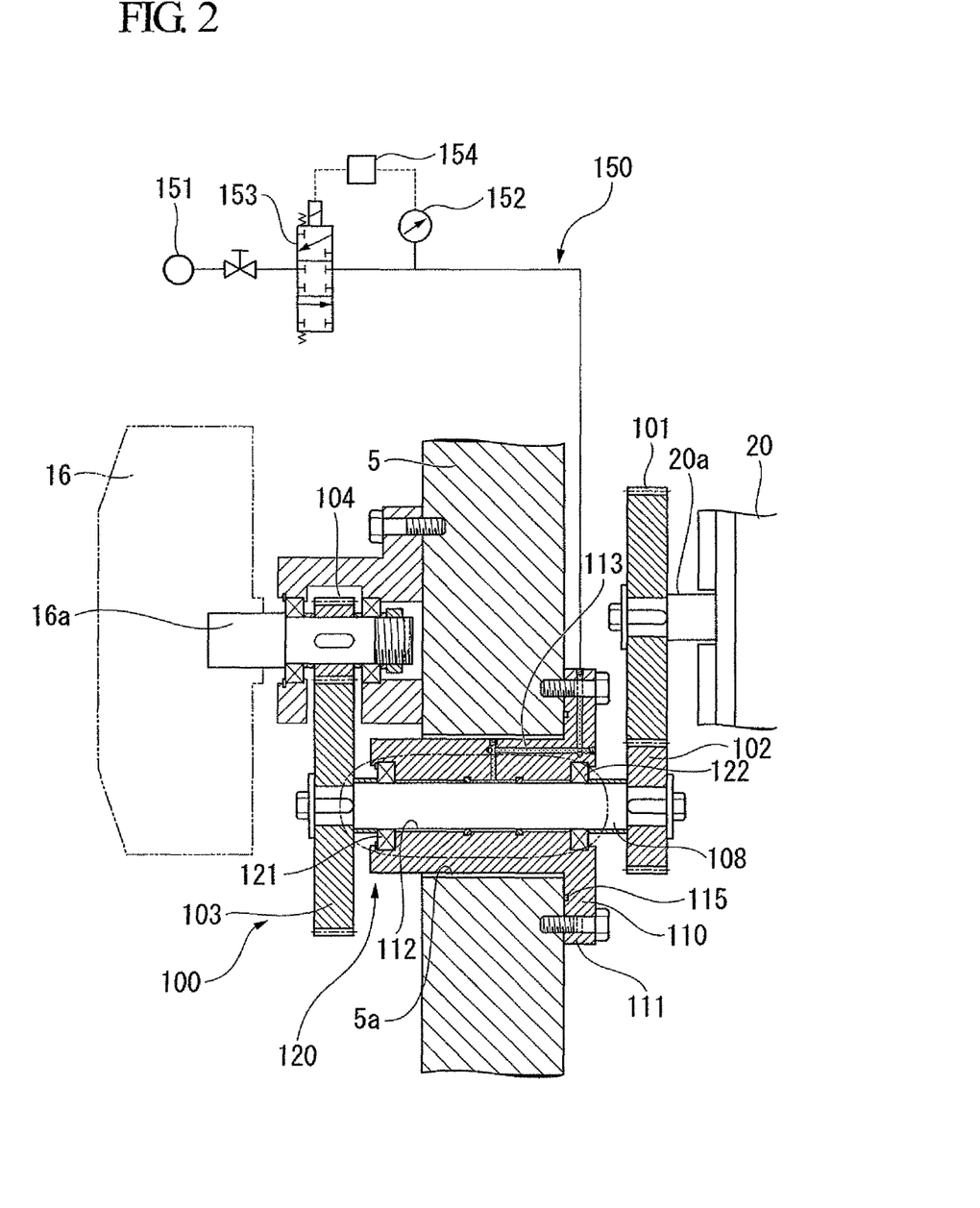
FIG. 2 is a cross-sectional view showing the constitution of the shaft seal structure 120 according to the present embodiment.
Figure 3:
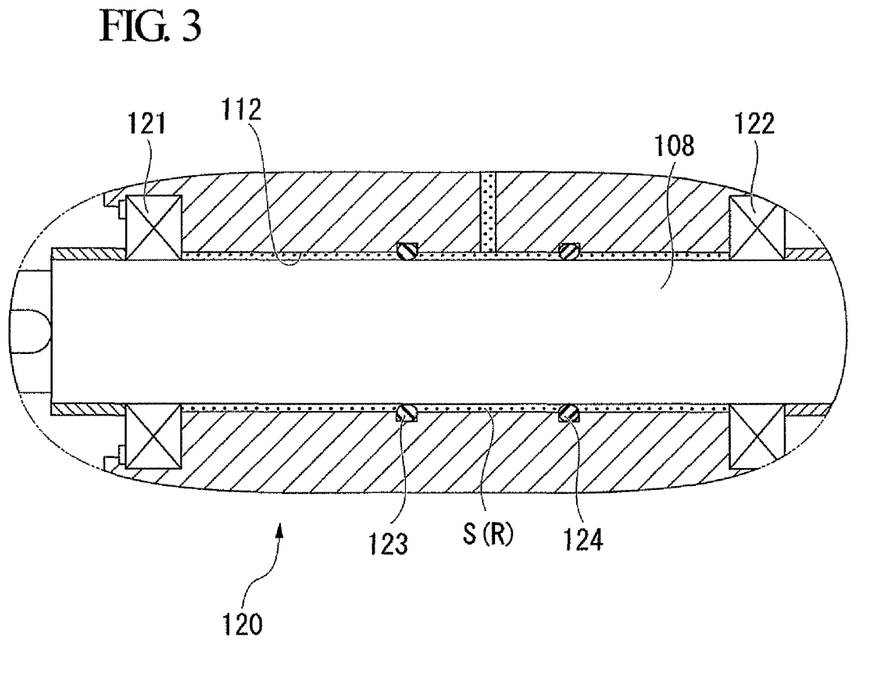
FIG. 3 is a magnified cross-sectional view of the shaft seal structure 120.

FIG. 2 is a cross-sectional view showing the constitution of the shaft seal structure 120 according to the present embodiment. FIG. 3 is a magnified cross-sectional view of the shaft seal structure 120.

A transmission mechanism 100 for transmitting rotation of the output shaft 20a of the cooling fan motor 20 to the cooling fan 16 is provided between the cooling fan 16 that is disposed in the cooling chamber 2 and the cooling fan motor 20 that is disposed outside of the cooling chamber 2.

The transmission mechanism 100 is constituted from a pair of gears 101, 102 that are provided outside of the cooling chamber 2, a pair of gears 103, 104 that are provided inside of the cooling chamber 2, and a rotating shaft 108 that passes through the door 5. The gear 101 has 80 teeth, and is coupled to the output shaft 20a of the cooling fan motor 20. The gear 102 has 40 teeth and is connected to one end of a rotating shaft 108 upon meshing with the gear 101. The gear 103 has 80 teeth, and is coupled to the other end of the rotating shaft 108. The gear 104 has 25 teeth and is connected to a rotating shaft 16a of the cooling fan 16 upon meshing with the gear 103. With such a constitution, when the output shaft 20a of the cooling fan motor 20 is rotated at 100 rpm, the cooling fan 16 rotates at 640 rpm.

The rotating shaft 108 is inserted in a through hole 112 of a bush 110 that has a flange 111 on one end, and in addition this bush 110 is fitted in a through hole 5a that is formed in the door 5. The rotating shaft 108 is supported by the bush 110 via the bearings 121, 122 that are provided at both ends of the through hole 112 of the bush 110. An O-ring 115 is disposed on the flange 111 of the bush 110, and so the flange 111 is sealed by the O-ring 115 as a result of the flange 111 abutting the outer surface of the door 5.

Then, the shaft seal structure 120 is disposed in the cylindrical gap that is formed between the rotating shaft 108 and the bush 110. The shaft seal structure 120 is constituted from two O-rings 123, 124 that are disposed in a gap between the rotating shaft 108 and the bush 110 and the grease R that is filled between the two O-rings 123, 124.

In the case of rotating the output shaft 20a at a rotational frequency of 100 rpm, the rotational frequency of the rotating shaft 108 is 200 rpm. When the rotational frequency of the rotating shaft 108 is 200 rpm or less, sufficient sealing is possible with the O-rings 123, 124. In this way, by disposing the transmission mechanism 100 on the inside of the door 5

(interior of the cooling chamber 2), it is possible to keep the rotational frequency of the rotating shaft 108 that passes through the door 5 low while rotating the cooling fan motor 20 at a desired rotational frequency.

Thereby, it is possible to apply the shaft seal structure 120 with a structure that is simple, moderately priced, and highly reliable as a shaft seal structure that is provided between the door 5 and the rotating shaft 108. Also, since the cooling fan motor 20 is disposed outside of the door 5 (outside of the cooling chamber 2), it is possible to use a moderately priced general-purpose motor instead of a specialized motor for use inside of the pressurized container as the cooling fan motor 20. Accordingly, it is possible to keep down the manufacturing cost of the multi-chamber heat treatment apparatus 1.

The grease R is filled at a predetermined pressure from the flange 111 side of the bush 110 into a space S that is enclosed by the two O-rings 123, 124 within a gap that is formed between the rotating shaft 108 and the bush 110. That is, two grooves for disposing the two O-rings 123, 124 and a grease supply hole 113 that connects to the flange 111 side from between these two grooves is formed on the inner surface of the through hole 112 of the bush 110.

An inert gas supplying portion 150 that is capable of pushing the grease R at a predetermined pressure with inert gas is coupled to the flange 111 side of the grease supply hole 113. The inert gas supplying portion 150 consists of a pressure source 151, a pressure sensor 152, an electromagnetic valve 153, and a pressure controller 154. The pressure source 151 is capable of supplying inert gas at the same pressure as the set pressure of the cooling chamber 2. The pressure sensor 152 indirectly measures the filling pressure of the grease R that is filled into the space S by measuring the pressure of the inert gas that has been supplied to the grease supply hole 113. The electromagnetic valve 153 is a valve that performs supplying and cutting off of inert gas to the grease supply hole 113 from the pressure source 151. The pressure controller 154 controls the electromagnetic valve 153 based on the measurement result of the pressure sensor 152.

Next, the operation of the multi-chamber heat treatment apparatus 1 constituted in this manner shall be described.

First, a treatment object that is placed on the tray 10 is placed on the transfer table 11 inside of the wind path chamber 7 in the state of the door 5 being separated from the cooling chamber 2. Then, the door is abutted against the cooling chamber 2, and the cooling chamber 2 is closed. The cooling chamber 2, the heating chamber 3 and the intermediate chamber 4 are evacuated by driving of a pressure reducing apparatus 57.

Then, the raising-lowering mechanism 26, the raising-lowering mechanism 55a, and the heat insulation door raising-lowering portion 55b are driven, whereby the conveying rod door 25, the vacuum shield door 6, and the heat insulation door 24 are opened. Here, the tray 10 is engaged and pulled by the distal end portion of the conveying rod 22, whereby the treatment object X is transported from the transfer table 11 that is inside of the wind path chamber 7 onto the transfer table 28 in the heating chamber 23.

Then, the raising-lowering mechanism 26 and the heat insulation door raising-lowering portion once again 55b are driven, whereby the conveying rod door 25 and the heat insulation door 24 are closed. Note that at this time, the raising-lowering mechanism 55a is not driven, and so the vacuum shield door 6 is maintained in an opened state. In this state, the treatment object X is heated to a predetermined temperature by the heater 29.

When the heating of the treatment object X is completed, the conveying rod door 25 and the heat insulation door 24 are opened, and the treatment object X is again transported to the transfer table 11 in the wind path chamber 7 by the conveying rod 22. Then, when then treatment object X has been transported to the transfer table 11 in the wind path chamber 7, the vacuum shield door 6 is hermetically sealed.

Then, the coolant gas is supplied to the cooling chamber 2 by a coolant gas supply apparatus (not shown). This coolant gas is circulated in the cooling chamber 2 by the cooling fan 16, whereby the treatment object X is cooled. At this time, by changing the gas passage ports 19a to 19d that each close at a predetermined time by the dampers 17a and 17b, the direction in which the coolant gas flows is changed, and thereby the coolant gas is blown all over the treatment object X, so that the treatment object X is uniformly cooled.

Here, the operation of the shaft seal structure 120 shall be described.

Figure 4:
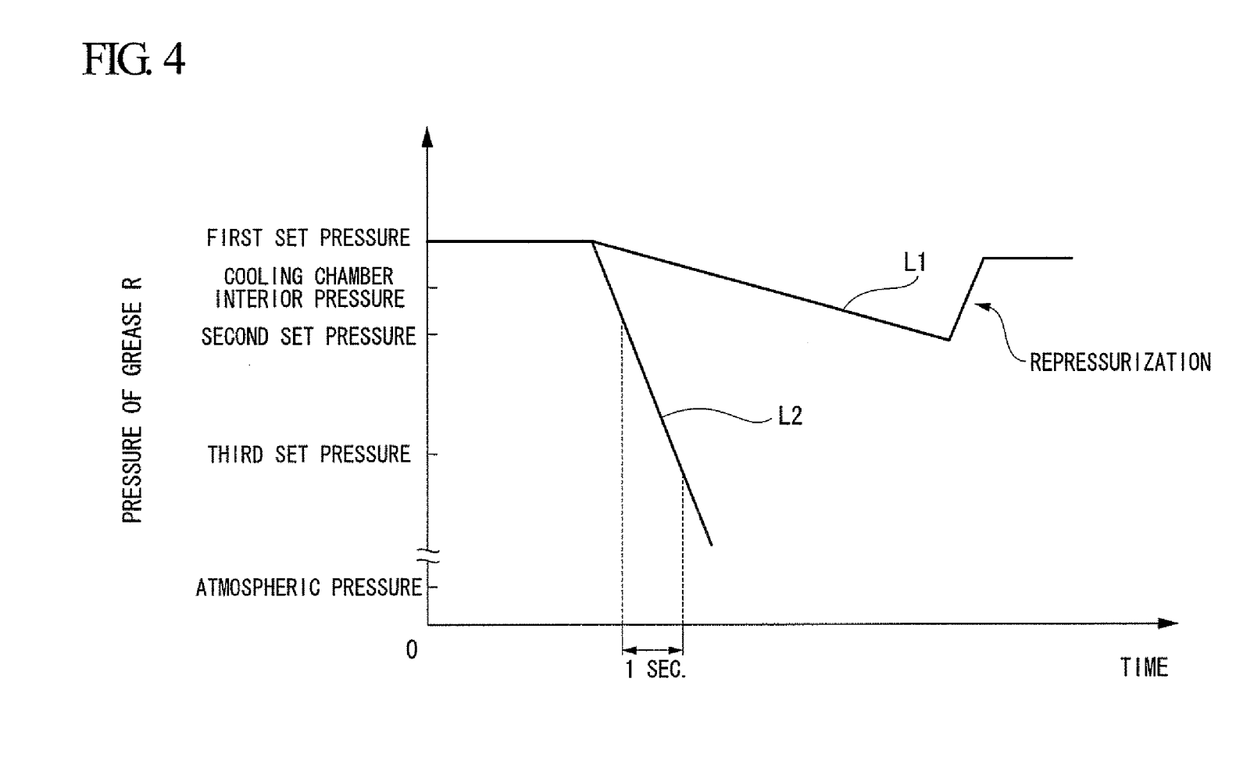
FIG. 4 shows changes in the filling pressure of the grease R of the shaft seal structure 120.

FIG. 4 shows changes in the filling pressure of the grease R of the shaft seal structure 120.

The coolant gas that is supplied from the coolant gas supply apparatus to the cooling chamber 2 is raised to a pressure of approximately 30 atm (3.0 MPa). By pressurizing the coolant gas, it is possible to cool the treatment object X in a short time.

Even when the interior of the cooling chamber 2 has been pressurized to approximately 30 atm, the shaft seal structure 120 is capable of withstanding the difference in pressure with the outside of the cooling chamber 2 at a high probability. Specifically, by setting the dimension of the gap in the radial direction of the space S in a predetermined range in accordance with the hardness of the Wrings 123, 124, it is possible to suppress projection of the Wrings 123, 124 from the grooves that are formed in the inner surface of the through hole 112 of the bush 110 without using a backup ring (for example, refer to JIS-B-2406).

However, in the case of no longer being able to maintain the sealed state with the shaft seal structure 120, the coolant gas in the cooling chamber 2 leaks to outside from the gap in which the O-rings 123, 124 are disposed, that is, the space between the rotating shaft 108 and the bush 110. As a result, there is a high possibility that the cooling process of the treatment object X may be incomplete.

Therefore, it is detected in the following manner whether or not the sealed state by the shaft seal structure 120 can no longer be maintained.

First, simultaneously with or prior to the pressurization of the coolant gas, an inert gas is supplied from the pressure source 151 to the grease supply hole 113 under the control of the pressure controller 154. Thereby, the grease R is raised to the same pressure as the inside of the cooling chamber 2 or a slightly higher pressure (for example, 31 atm (3.1 MPa), with this pressure called a first set pressure). Thereby, since the pressure of the cooling chamber 2 and the space S become approximately the same, or the pressure of the space S becomes higher than the cooling chamber 2, leakage of the coolant gas is more reliably prevented.

Next, by operating the electromagnetic valve 153 to shut off the supply of inert gas from the pressure source 151 to the grease supply hole 113, the state of the grease R being pressurized is maintained.

As shown in FIG. 4, even in the case where the coolant gas in the cooling chamber 2 is normally enclosed by the shaft seal structure 120, the filling pressure of the grease R of the shaft seal structure 120 falls gradually (refer to line L1). This is because the grease R gradually leaks from the space S to the outside of the O-rings 123, 124, that is, to the inside or the outside of the cooling chamber 2. The filling pressure of the grease R of the shaft seal structure 120 is detected by the pressure sensor 152 as described above.

If the pressure sensor 152 detects that the filling pressure of the grease R is approximately the same as the pressure in the cooling chamber 2 or has dropped to a slightly lower pressure (this pressure being called a second set pressure), the pressure controller 154 operates the electromagnetic valve 153 to resupply inert gas from the pressure source 151 to the grease supply hole 113. Thereby, the filling pressure of the grease R is again pressurized to 31 atm. By repeating this process, leakage of the coolant gas to outside of the cooling chamber 2 due to the enclosure state by the shaft seal structure 120 not being maintainable is prevented while the process of cooling the treatment object X in the cooling chamber 2 is performed. Note that when the second set pressure is detected by the pressure sensor 152, an alarm or the like may be issued.

If the processing object X is cooled to a predetermined temperature, the door 5 will be detached from the cooling chamber 2, and the processing object X will be brought outside.

On the other hand, regardless of the abovementioned response, in the case of the enclosure state by the shaft seal structure 120 becoming unmaintainable and the coolant gas of the cooling chamber 2 leaking to outside through the space S, the filling pressure of the grease R of the shaft seal structure 120 rapidly falls (refer to line L2).

If the filling pressure of the grease R of the shaft seal structure 120 falls to a pressure that is sufficiently lower than the pressure in the cooling chamber 2 (with this pressure being called a third set pressure) in for example a short span of time of about 1 second, the process of cooling the treatment object X is stopped. Specifically, the coolant gas that is filled inside of the coolant chamber 2 is released from a safety valve not illustrated that is provided in the cooling chamber 2. Also, a measure is performed such as stopping driving of the cooling fan motor 20. In addition, the pressurization of the grease R of the shaft sealing configuration 120 by the inert gas supplying portion 150 is stopped, and so becomes atmospheric pressure.

Thereby, even when the enclosure state by the shaft seal structure 120 has become unmaintainable, since the cooling fan motor 20 (output shaft 20a) is stopped at an early stage, it is possible to prevent the two O-rings 123, 124 of the shaft seal structure 120 from cracking or being severed.

Accordingly, reuse of the shaft seal structure 120 is possible without disassembling and repairing. Note that when the reason for not being able to maintain the enclosure state by the shaft seal structure 120 is due to breakage of the two O-rings 123, 124, the O-rings 123, 124 are replaced.

Figure 5:
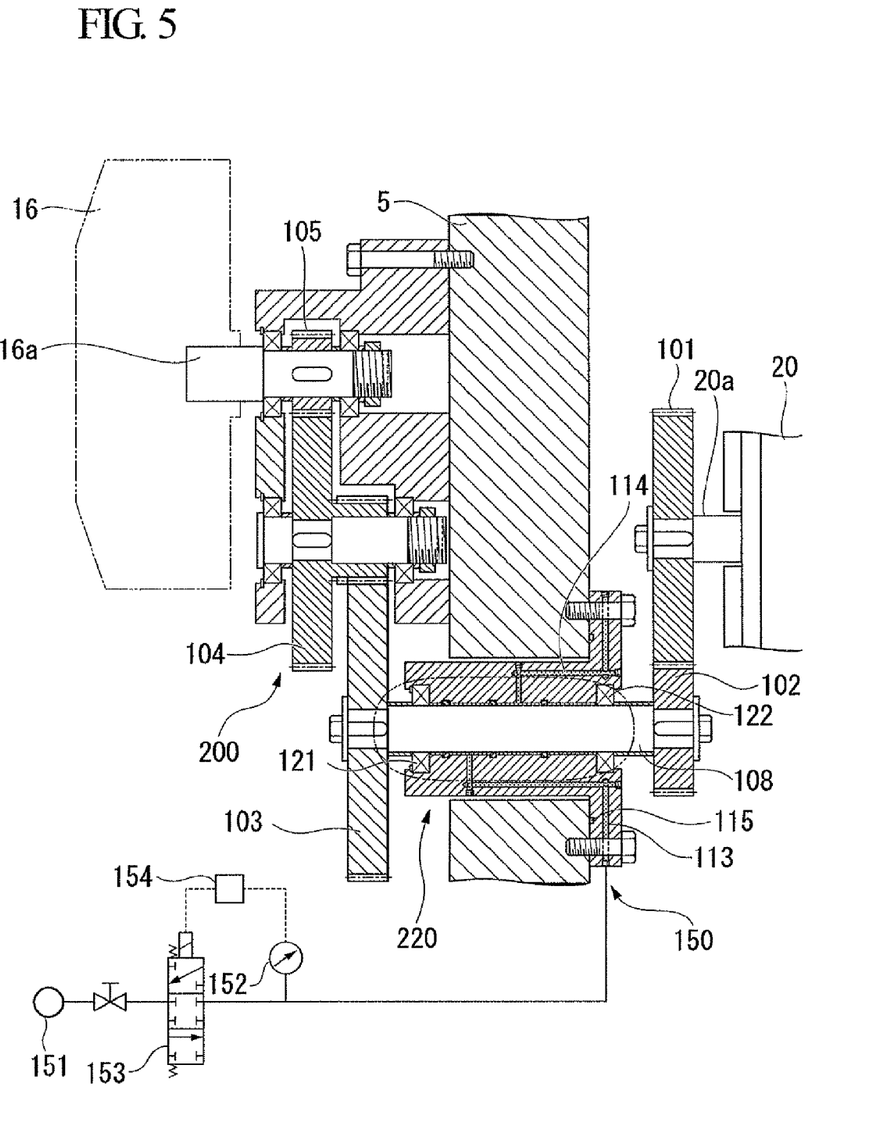
FIG. 5 shows a variation of the transmission mechanism 100 and the shaft seal structure 120.
Figure 6:
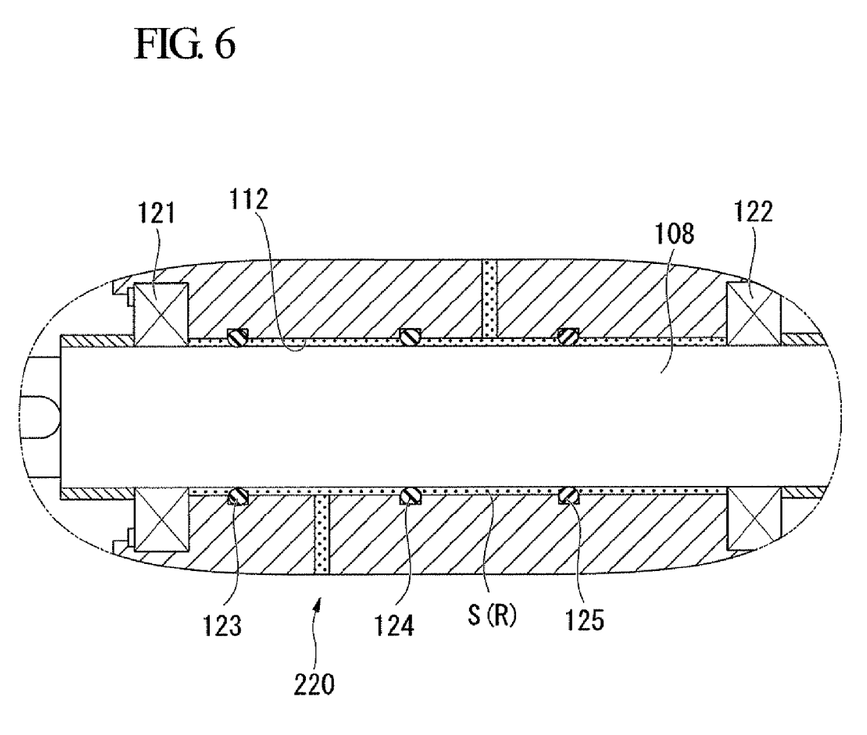
FIG. 6. shows a magnified cross-sectional view of the shaft seal structure 220.

FIG. 5 shows a transmission mechanism 200 and a shaft seal structure 220. FIG. 6 is an enlarged cross-sectional view of the shaft seal structure 220.

The shaft seal structure 220 that is a variation of the shaft seal structure 120 is constituted from three O-rings 123, 124, 125 on the rotating shaft 108 and grease R that is filled between the three O-rings 123, 124, 125. The grease R that is filled between the O-rings 123, 124 among the O-rings 123, 124, 125 is filled at a predetermined pressure from the flange 111 side of the bush 110 via the grease supply hole 113. That is, the inert gas supplying portion 150 is coupled to the grease supply hole 113. Note that the filling pressure of the grease R that is filled between the O-rings 124, 125 is filled at the same pressure as the outside atmosphere. In this way, the shaft seal structure 220 may be provided with three or more O-rings. In the case of providing three or more O-rings, the grease R that is set to the first set pressure is filled between the two O-rings 123, 124 that are closest to the cooling chamber 2. Note that the grease R that is set to the first set pressure may also be filled between the O-rings 124, 125.

The transmission mechanism 200 that is a variation of the transmission mechanism 100 is constituted from a pair of gears 101, 102 that are provided outside of the cooling chamber 2, a pair of gears 103, 104, 105 that are provided inside of the cooling chamber 2, and a rotating shaft 108 that passes through the door 5. In this way, it is possible to make changes as required to the configuration of the transmission mechanism 200 such as the size and required rotational frequency of the cooling fan 16, or the specifications of the cooling fan motor 20. However, the rotational frequency of the rotating shaft 108 needs to be 200 rpm or less. This is in order to enable use of O-rings 123, 124, 125 as the shaft seal structure 120, 220.

Note that it is possible to use an engine instead of the cooling fan motor 20. In the case of using an engine, it is preferred to operate the engine prior to the process of cooling treatment object X in order to obtain a stable output (rotation). For example, by running the motor from 30 seconds prior to starting the process of cooling treatment object X, stabilized output is obtained at the time of the cooling process.

Also, instead of the case of coupling the inert gas supplying portion 150 to the shaft seal structure 120, 220, by coupling a pipe of the same pressure that is connected to the cooling chamber 2 to the shaft seal structure 120, 220, the grease R that is disposed between the O-rings may be filled at a predetermined pressure.

Also, the shaft seal structure 120, 220 is not limited to the case of being disposed at the door 5 of the cooling chamber 2. Provided it is a rotating shaft that passes through container wall of a pressurized container, it may be any kind of container, In this case, by coupling the inert gas supplying portion 150 to the shaft seal structure 120, 220, there is no need to detect the filling pressure of the grease R that is disposed between the plurality of O-rings.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

INDUSTRIAL APPLICABILITY

The shaft seal structure of the present invention can be applied to a fitting portion between a container wall of a pressurized container in which high-pressure gas is enclosed and a fitting portion with a rotating shaft that passes through this container wall.

What is claimed is:

1. A shaft seal structure for a rotating shaft passing through a container wall of a pressurized container for enclosing high pressure gas, the shaft seal structure comprising:
   a pair of bearings including a first bearings positioned at a first position of a fitting portion between the container wall and the rotating shaft, and a second bearings positioned along an axial direction of the rotating shaft at a second position of the fitting portion between the container wall and the rotating shaft;
   O-rings that are positioned at at least two locations in the axial direction of the rotating shaft between the pair of bearings at the fitting portion; and grease that is pressurized to approximately a pressure that is same as the pressure of the high pressure gas in a space that is formed by the rotating shaft, the container wall, and the O-rings.

2. The shaft seal structure according to claim 1, further comprising a grease pressure measuring portion positioned and configured to measure a change in the pressure of the grease that is filled in the space and to obtain a measurement result, and a gas leakage detecting portion positioned and configured to detect a leak of the high pressure gas from the pressurized container based on the measurement result of the grease pressure measuring portion.

3. A pressure regulating method for the shaft seal structure according to claim 2, the method comprising:

pressurizing the grease to a first set pressure and maintaining that state, and pressurizing the grease to the first set pressure again when the pressure of the grease has fallen to a second set pressure.

4. A cooling treatment apparatus configured to accommodate a treatment object that has been subjected to heat treatment in a pressurized container comprising a container wall and to cool the treatment object by supplying high pressure gas in the pressurized container and circulating the high pressure gas with a fan, the cooling treatment apparatus comprising a shaft seal structure including:

a pair of bearings including a first bearings positioned at a first fitting portion between the container wall and the rotating shaft, and a second bearings positioned along an axial direction of the rotating shaft at a second fitting portion between the rotating shaft and the container wall so as to transmit torque to the fan and the container wall;

O-rings positioned at least two locations in the axial direction of the rotating shaft between the pair of bearings; and grease that is pressurized to approximately a pressure that is same as the pressure of the high pressure gas in a space that is formed by the rotating shaft, the container wall, and the O-rings.

5. The cooling treatment apparatus according to claim 4, wherein the shaft seal structure comprises:

a grease pressure measuring portion positioned and configured to measure a change in the pressure of the grease that is filled in the space and to obtain a measurement result, and a gas leakage detecting portion positioned and configured to detect a leak of the high pressure gas from the pressurized container based on the measurement result of the grease pressure measuring portion.

6. An operating method for the cooling treatment apparatus of claim 5, the method comprising:

pressurizing the grease to a first set pressure and maintaining that state, and stopping the cooling treatment operation when the pressure of the grease has fallen from a second set pressure to a third set pressure in a predetermined time.

7. The cooling treatment apparatus according to claim 4, further comprising an acceleration mechanism configured to rotate the fan at a higher rotational frequency than the rotating axis.

8. A multi-chamber heat-treatment apparatus comprising a heating chamber that performs heat treatment on a treatment object and a cooling chamber that performs cooling treatment on the treatment object that has been subjected to heat treatment in the heating chamber, wherein the cooling chamber is the cooling treatment apparatus according to claim 4.

* * * * *